United States Patent [19]

Rosenstock et al.

[11] Patent Number: 5,094,012

[45] Date of Patent: Mar. 10, 1992

[54] PROCESS FOR DECONTAMINATING CONTAMINATED SOILS

[75] Inventors: Friedrich Rosenstock, Frankfurt am Main; Jochen Guntner, St. Andreasberg; Elmar Haite, Frankfurt am Main, all of Fed. Rep. of Germany

[73] Assignee: Metallgesellschaft AG, Frankfurt am Main, Fed. Rep. of Germany

[21] Appl. No.: 604,027

[22] Filed: Oct. 24, 1990

[30] Foreign Application Priority Data

Nov. 15, 1989 [DE] Fed. Rep. of Germany ....... 3937952

[51] Int. Cl.$^5$ ................................................. F26B 3/00
[52] U.S. Cl. ............................................ 34/32; 34/73; 34/22; 34/57 A
[58] Field of Search .................. 34/17, 57 A, 57 B, 22, 34/27, 32, 210, 73; 110/236

[56] References Cited

U.S. PATENT DOCUMENTS

| | | | |
|---|---|---|---|
| 3,954,069 | 5/1976 | Loken | 110/226 |
| 4,257,168 | 3/1981 | Carroll et al. | 34/17 |
| 4,648,332 | 3/1987 | Goedhart | 110/236 |
| 4,704,804 | 11/1987 | Wyatt et al. | 34/17 |
| 4,962,592 | 10/1990 | Orizand | 34/17 |
| 4,974,335 | 12/1990 | Bege et al. | 34/17 |

FOREIGN PATENT DOCUMENTS

| | | |
|---|---|---|
| 3604761 | 8/1987 | Fed. Rep. of Germany . |
| 3706684 | 10/1987 | Fed. Rep. of Germany . |
| 3633699 | 11/1988 | Fed. Rep. of Germany . |
| 3815461 | 5/1989 | Fed. Rep. of Germany . |

OTHER PUBLICATIONS

Kirk-Othmer, "Encyclopedia of Chemical Technology", Third Edition, vol. 21, p. 507, May 1983.

*Primary Examiner*—Henry A. Bennet
*Assistant Examiner*—Denise L. Gromada
*Attorney, Agent, or Firm*—Sprung Horn Kramer & Woods

[57] ABSTRACT

To decontaminate contaminated soil, a layer of the soil is formed on a gas-permeable support in a pressure housing, steam at a temperature from 100° to 190° C. and under a pressure from 1 to 12 bars is fed to the pressure housing and is passed through the layer, the vapor leaving the layer is withdrawn from the pressure housing and condensed. The condensate is purified and the solids are carried away as decontaminated soil.

6 Claims, No Drawings

PROCESS FOR DECONTAMINATING CONTAMINATED SOILS

This invention relates to a process of decontaminating contaminated soils, wherein the soils are treated with water vapor and the vapor leaving the soil is condensed.

It is more and more urgently required to decontaminate soils or dumps which are contaminated with hydrocarbons, oil, other organic compounds or heavy metals, but such decontamination is highly expensive and difficult. The mineral content of the soil is in excess of 60% by weight and in most cases in excess of 70% by weight. The contaminants are disposed on the surface of the particles and in most cases are not water-soluble.

From Published German Application 36 04 761 it is known that soil contaminated with hydrocarbons can be heated in a treating vessel under an atmospheric to slightly superatmospheric pressure to a temperature above the boiling temperature of the hydrocarbons, an inert carrier gas can then be supplied and the escaping hydrocarbons and carrier gas can be subjected to a fractional condensation with withdrawal of the condensates. For heating, at least part of the heat employed is preferably supplied in a rotary kiln. The contaminated soil must be heated to a temperature of about 400° C. and the water contained in the soil must also be heated to that temperature.

From German Patent Specification 36 33 699 it is known to transform contaminated soil to a pumpable suspension by homogenizing and reducing in size with an addition of circulated water, to treat the suspension in an extracting system at a temperature of 120° to 180° C. and under a pressure of 8 to 12 bars with circulating water in a countercurrent operation, to dry the suspension withdrawn from the extracting system to a residual moisture content below 30% by weight, and to remove the dissolved substances from the circulating water by cooling. The pressure maintained in the extracting system is so high that it lies above the vaporization point of water. Only the substances which are soluble in water will be removed by the process.

It is known from Published German Application 37 06 684 that contaminated soils can be heated to a temperature from 200° to 700° C. by a direct or indirect heating with hot gases or hot steam in a rotary kiln or a fluidized bed furnace, whereafter the polluting components are evaporated together with the natural water content, a major part of the water vapor is condensed from the exhaust gases, the condensate is purified and the remaining gases are purified too. In order to oxidize residual organic matter, the dry soil will be passed through the combustion zone for a short time if direct heating is employed. The vapors formed by the heating are sucked off by a negative pressure applied to the system. In that process the soil must be heated to high temperatures and only impurities which are vaporized can be removed.

It is an object of the invention to remove from soils as many organic and inorganic impurities as possible as completely as possible and with an expenditure which is as small as possible.

That object is accomplished in accordance with the invention in that a layer of soil is formed on a gas-permeable support in a pressure housing, steam at a temperature from 100° to 190° C. and under a pressure from 1 to 12 bars is fed to the pressure housing and is passed through the layer, the vapor leaving the layer is withdrawn from the pressure housing and condensed, the condensate is purified and the solids are carried away as decontaminated soil. The soil is suitably applied to the gas-permeable support as an aqueous suspension. The soil must have a high permeability to gas and must not contain coarse particles. Coarse particles in excess of about 2 mm and preferably in excess of 1 mm are removed before the soil is fed. If the soil in a raw state is not sufficiently permeable to gas, its permeability to gas will be increased by a suitable desludging. The permeability to gas may also be increased by admixing of soils having a relatively high permeability to gas or by admixing of other materials, such as limestone grit. Preferably, the layer of soil is formed on a horizontally extending, gas-permeable support and the steam is passed through the layer from top to bottom. Alternatively, the layer may be covered at its top by a suitable material, such as woven filter fabrics, and the steam may then be passed through the layer from bottom to top. The removal of coarse particles from the soil and an optional desludging of the soil may particularly be effected by the process disclosed in Published German Application 38 15 461. The steam which is introduced will initially result in a dewatering of the layer in that the capillary water is expelled. Thereafter the layer is heated by the steam now flowing at a high rate. The steam employed may consist of saturated steam or wet steam. Saturated steam is dry saturated steam. Wet steam consists of saturated steam which contains moisture. Dewatering is preferably effected with saturated steam. Saturated steam is suitably also employed to heat the layer.

In accordance with a preferred feature the contaminated soil is treated to have a surface area below 10,000 $cm^2/g$ before the soil is applied to the gas-permeable support. A smaller surface area, i.e., a higher permeability, will usually result in better operating conditions. To control the surface area, the soil is desludged or soils having different surface areas are mixed.

In accordance with a preferred feature an aqueous suspension of the contaminated soil is applied to the gas-permable support in such a manner that the dewatered layer has a permeability to air of 20 to 150 $sm^3$ per hour and square meter of the area of the layer ($sm^3$=standard cubic meter). The term "dewatered layer" is used to indicate that capillary water is no longer contained in the layer. The layer is suitably dewatered in that the steam is introduced but the layer may also be dewatered by compressed air. To control the permeability of the layer to air the height of the dried layer is selected in dependence on the actual surface area of the contaminated soil. Good operating conditions will be obtained with that permeability to air.

In accordance with a preferred feature the layer of soil on the gas-permeable support is initially dewatered and saturated steam is subsequently passed through the layer at least until the layer has approximately reached the temperature of the saturated steam. The dewatering initially causes only the capillary water to be expelled and virtually no gas passes through the layer at that time. The dewatering will be succeeded by a breakthrough and the steam will then flow through the layer, water vapor will condense in the layer and the layer will be heated. When the lower portion of the layer has been heated there will be a full flow of steam through the layer. When the entire layer has been heated, saturated or wet steam is passed through the layer until the final concentration of pollutants in the soil has reached the desired value. By that processing, those pollutants will be removed which vaporize or melt or are soluble under the operating conditions.

In accordance with a preferred feature the dewatering or heating of the layer is succeeded by a step in which wet steam that contains oxidizing substances is passed through the layer. Air may primarily be used as an oxidizing substance but, e.g., oxygen-enriched air and/or $H_2O_2$ may alternatively be used. After the drying the oxidizing substances may be introduced together with the steam and in that case an oxidation will already be effected in the heated upper zones of the layer. Alternatively, the oxidizing substances may be introduced together with the steam when the entire layer has completely been heated. Alternatively, the heating of the entire layer by the steam may be succeeded by a step in which only a hot oxidizing gas under a suitable pressure and at a suitable temperature is passed through the layer. Wet oxidizable pollutants will be oxidized and removed from the soil owing to the addition of the oxidizable substances.

In accordance with a preferred embodiment, part of the steam which has left the layer is recycled and used to preheat the aqueous suspension of the contaminated soil before the latter is applied to the support. The heat consumption can be lowered considerably thereby.

In accordance with a preferred feature, soils are employed which are contaminated with TNT (trinitrotoluene). Such soils can be particularly effectively decontaminated by the process.

The invention will be explained more in detail with reference to examples. HC means hydrocarbons; PAH means polycyclic aromatic hydrocarbons.

EXAMPLE 1

100 g of a soil which was contaminated with hydrocarbons were mixed with water at a ratio of 1:2 and applied to a horizontal pressure filter. The soil had a surface area of 2100 cm$^2$/g and its particle size was 100% below 0.5 mm and 80% below 0.051 mm. The layer formed on the pressure filter had a height of 5 cm and after drying had a permeability to air of 90 sm$^3$/h/m$^2$.

Saturated steam of 10 bars and 180° C. was introduced into the layer of soil until the soil had been heated to the temperature of the steam. At 10 bars and 157° C., a mixture consisting of wet steam and air was then introduced for 15 minutes.

The analysis of the thus treated soil had the following result:

|  | % by weight | Total HC (mg/kg) | PAH (mg/kg) |
| --- | --- | --- | --- |
| Decontaminated soil | 99.2 | 320 | 18 |
| Raw soil | 100.0 | 4,650 | 2,300 |

EXAMPLE 2

The same soil as in Example 1 was dried and heated as in Example 1. Thereafter, saturated steam at 10 bars and 180° C. was introduced further without an addition of air.

The analysis of the thus treated soil had the following result:

|  | % by weight | total HC (mg/kg) | PAH (mg/kg) |
| --- | --- | --- | --- |
| Decontaminated soil | 99.3 | 870 | 24 |
| Raw soil | 100.0 | 4,650 | 2,300 |

EXAMPLE 3

100 g of a soil contaminated with TNT were mixed with water at a ratio of 1:1.5 and applied to the pressure filter. The soil had a surface area of 800 cm$^2$/g and its particle size was 100% below 1 mm and 80% below 0.102 mm. The layer formed on the pressure filter had a thickness of 5 cm and after drying had a permeability to air of 120 sm$^3$/h/m$^2$.

Saturated steam at 4 bars and 143° C. was introduced. The layer of soil was heated to the temperature of the steam and the introduction of the same saturated steam was then continued for further 15 minutes.

Two soils which had different contents of TNT were analyzed after the treatment with the following results:

|  |  | % by weight | TNT content (mg/kg) |
| --- | --- | --- | --- |
| a) | Decontaminated soil | 99.98 | 0.324 |
|  | Raw soil | 110.0 | 150.0 |
| b) | Decontaminated soil | 99.22 | 3.0 |
|  | Raw soil | 100.0 | 5,931.0 |

The advantages afforded by the invention reside in that contaminated soils can be decontaminated at a relatively low expenditure and the decontaminated product consists of a soil which can be re-used.

It will be understood that the specification and examples are illustrative but not limitative of the present invention and that other embodiments within the spirit and scope of the invention will suggest themselves to those skilled in the art.

What is claimed is:

1. A process of decontaminating contaminated soils, comprising providing an aqueous suspension of the contaminated soil on a gas-permeable support in a pressure housing in such manner that there is formed a dewatered layer having a permeability to air of 20 to 150 sm$^3$ per hour and square meter of the area of the layer, passing steam at a temperature from 100° to 190° C. and under a pressure from 1 to 12 bars through the soil layer, withdrawing the vapor leaving the layer from the pressure housing, condensing such vapor to form a condensate, and removing the now-decontaminated soil.

2. The process according to claim 1, wherein the contaminated soil is treated to have a surface area below 10,000 cm$^2$/g before steam is passed through the gas-permeable support.

3. The process according to claim 1, wherein the layer of soil on the gas-permeable support is initially dewatered, and saturated steam is subsequently passed through the layer at least until the layer has assumed approximately the temperature of the saturated steam.

4. A process according to claim 1, wherein wet steam that contains an oxidizing substance is passed through the soil layer.

5. A process according to claim 1, wherein part of the steam which has left the soil layer is recycled and used to preheat the aqueous suspension of the contaminated soil before the latter is applied to the support.

6. A process according to claim 1, wherein the soil contaminant includes TNT.

* * * * *